(12) United States Patent
Truglio

(10) Patent No.: US 9,039,082 B2
(45) Date of Patent: May 26, 2015

(54) BICYCLE SADDLE

(71) Applicant: VELO EUROPE S.R.L., Busnago (Monza Brianz) (IT)

(72) Inventor: Salvatore Truglio, Busnago (IT)

(73) Assignee: VELO EUROPE S.R.L., Busnago (IT)

( * ) Notice: Subject to any disclaimer, the term of this patent is extended or adjusted under 35 U.S.C. 154(b) by 0 days.

(21) Appl. No.: 13/913,810

(22) Filed: Jun. 10, 2013

(65) Prior Publication Data

US 2014/0028064 A1     Jan. 30, 2014

(30) Foreign Application Priority Data

Jul. 24, 2012    (IT) .............................. MO2012A0187

(51) Int. Cl.
    *B62J 1/00*         (2006.01)
    *B62J 1/18*         (2006.01)
    *B62J 1/22*         (2006.01)

(52) U.S. Cl.
    CPC .............. *B62J 1/18* (2013.01); *Y10T 29/49826* (2015.01); *B62J 1/22* (2013.01)

(58) Field of Classification Search
    CPC ................................... B62J 1/005; B62J 1/22
    USPC ........................ 297/195.1, 202, 214, 219.11
    See application file for complete search history.

(56) References Cited

U.S. PATENT DOCUMENTS

| | | | | |
|---|---|---|---|---|
| 594,316 | A * | 11/1897 | Basch ........................... | 297/202 |
| 1,975,405 | A * | 10/1934 | Pryale ...................... | 297/215.16 |
| 3,997,214 | A * | 12/1976 | Jacobs ........................... | 297/214 |
| 5,165,752 | A * | 11/1992 | Terry ............................. | 297/214 |
| 5,720,518 | A * | 2/1998 | Harrison ....................... | 297/214 |
| 6,371,554 | B1 * | 4/2002 | Ko ................................. | 297/201 |
| 6,481,792 | B1 * | 11/2002 | Goin ........................ | 297/195.13 |
| 7,478,872 | B2 * | 1/2009 | Lee ................................ | 297/214 |
| 7,572,498 | B2 * | 8/2009 | Bigolin ........................ | 297/214 |
| 2004/0026968 | A1 | 2/2004 | Kim | |
| 2007/0273184 | A1 * | 11/2007 | Garneau .................... | 297/195.1 |

FOREIGN PATENT DOCUMENTS

| | | | |
|---|---|---|---|
| EP | 1132283 | A2 | 9/2001 |
| FR | 1094718 | A | 5/1955 |
| FR | 1104900 | A | 11/1955 |

\* cited by examiner

*Primary Examiner* — Peter Brown
(74) *Attorney, Agent, or Firm* — Pearne & Gordon LLP

(57) ABSTRACT

A bicycle saddle comprising: a supporting frame (2), set up for connecting the saddle to a seat post; a resting base (3), connected to the supporting frame (2) and intended for transmitting the weight of the cyclist to the supporting frame (2), which is provided with a front portion (31) and with a rear portion (32); a cover (4) that covers the resting base (3) and is intended for defining the surface of contact with the cyclist; a shock-absorbing anti-sliding insert (5), interposed between the resting base (3) and the cover (4), which protrudes at least partially from the cover (4) through an opening (41) made on the cover (4).

16 Claims, 3 Drawing Sheets

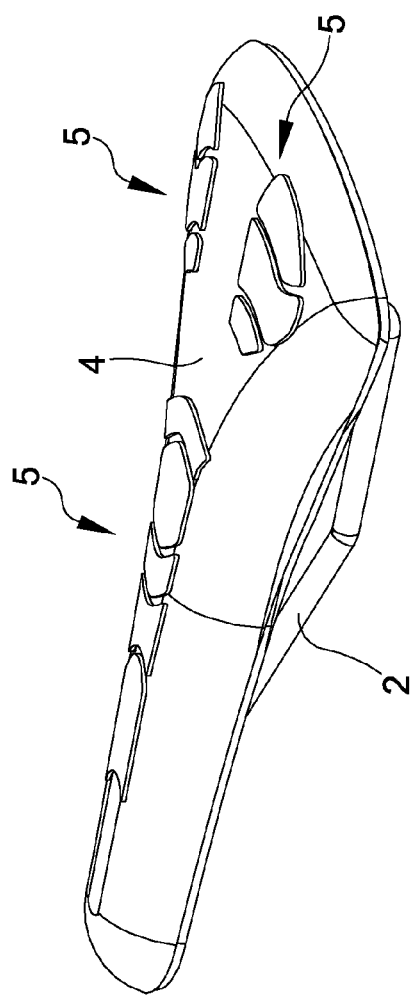
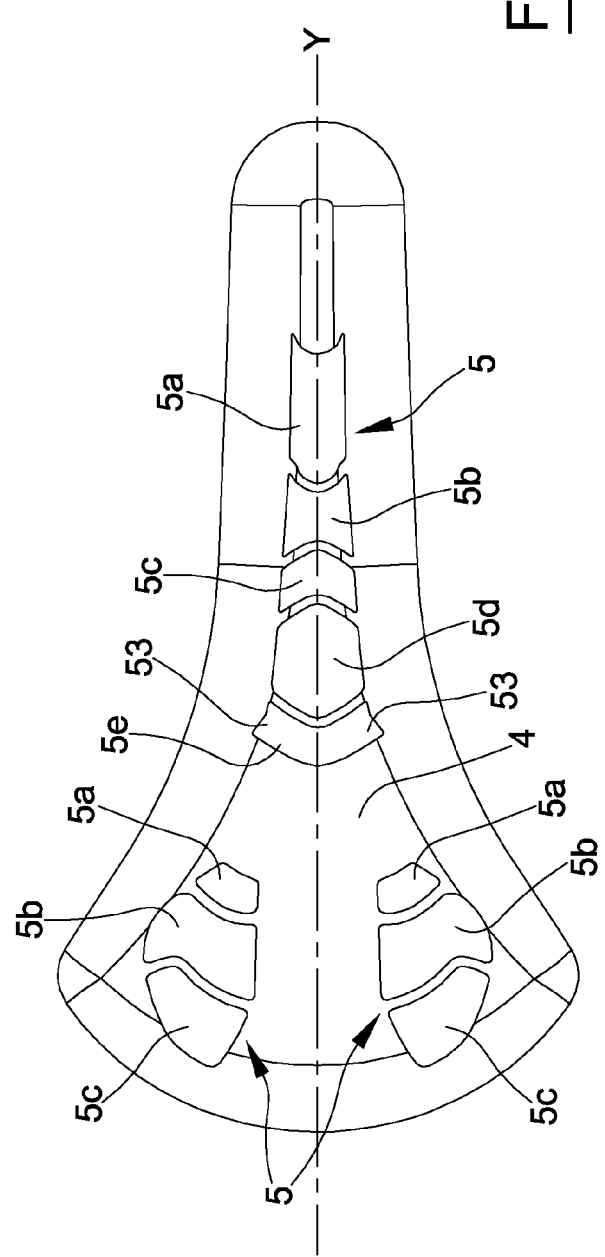

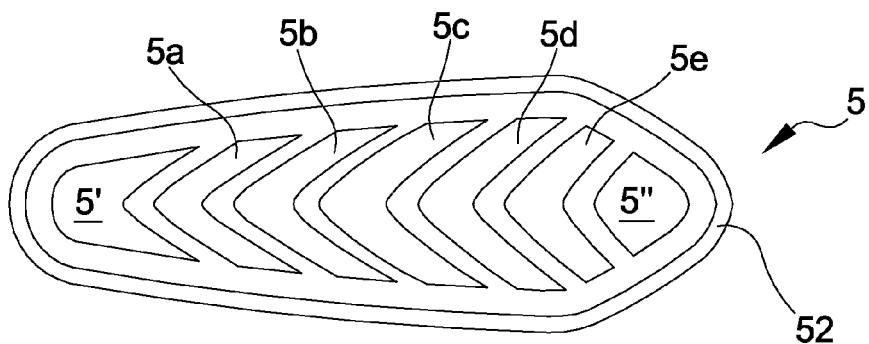
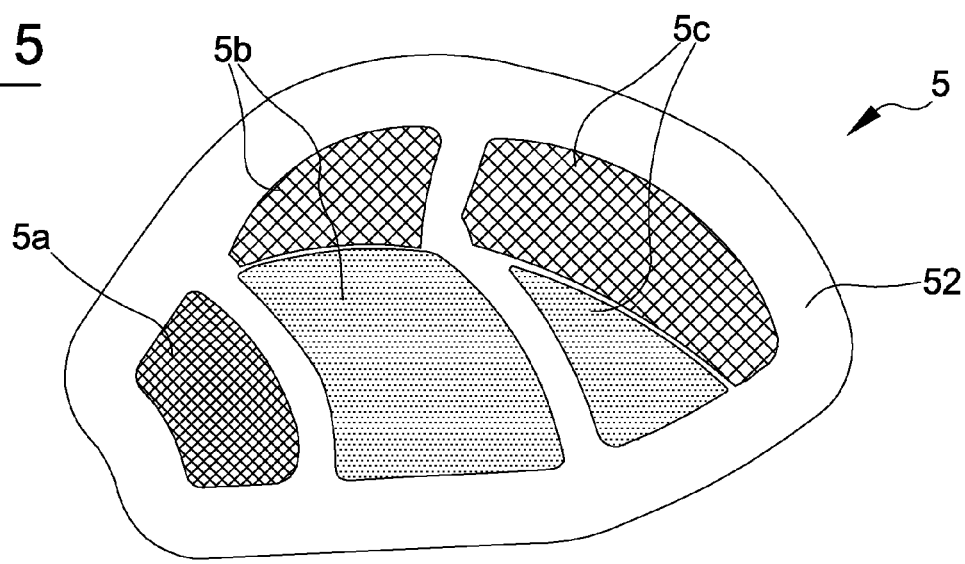
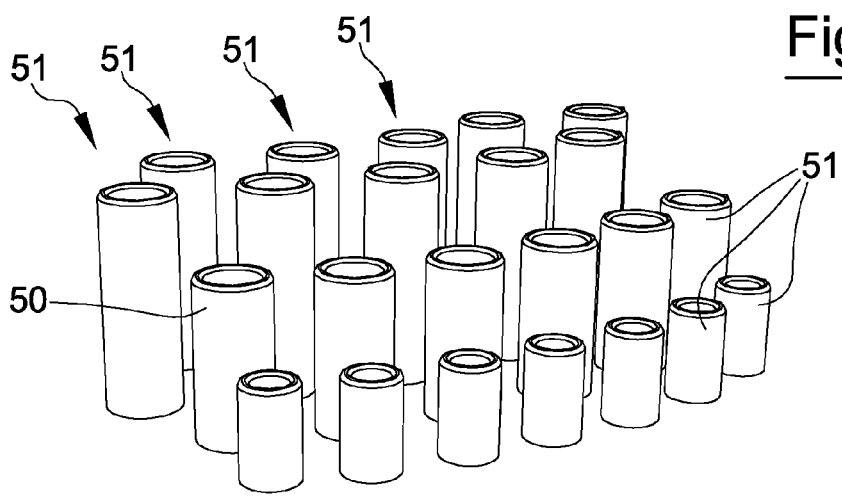

BICYCLE SADDLE

The present invention relates to a bicycle saddle.

In the practice of cycling, it is very important for the cyclist to be firmly and comfortably in contact with his or her bicycle. The firmness of contact with the bicycle serves to increase the output of the effort produced by the cyclist by limiting wastes of energy due to relative movements between cyclist and bicycle. Comfort on the bicycle enables the cyclist to concentrate effectively and at maximum intensity on the effort required to move forward.

The areas of contact between the cyclist and his or her vehicle are substantially located on the handlebars, saddle and pedals.

The most critical area of contact between cyclist and bicycle is located on the saddle.

In fact, a cyclist bears upon the saddle with most of his or her weight and tends to slide on it at each turn of the pedal. The sliding is limited only by the friction generated between saddle and cyclist.

It thus occurs that, during particularly intense exertion, the athlete will slide repeatedly on the saddle, thus wasting part of the energy generated while pedalling. In particular, at each turn of the pedal the athlete tends to slide slightly forward or backward, thus wasting part of the effort expended.

Furthermore, since the athlete bears upon the saddle with most of his or her weight, rather uncomfortable pressure peaks are often generated, above all in particularly sensitive areas. This induces the athlete to constantly change and adjust his or her position on the saddle, resulting in a further waste of energy.

In an attempt to limit sliding and increase the cyclist's comfort, various types of saddles have been proposed, each featuring specific devices which in any case contribute only partly to solving the problem.

The object of the present invention is to provide a bicycle saddle which enables the limitations of saddles of a known type to be overcome.

One advantage of the saddle according to the present invention is that it reduces the sliding of the athlete on the saddle to much lower levels as compared to saddles of a known type.

Another advantage of the saddle according to the present invention is that it considerably reduces the pressure peaks in the areas of contact between cyclist and saddle.

Another advantage of the saddle according to the present invention is that it considerably improves the dispersal of heat compared to saddles of a known type.

A further advantage of the saddle according to the present invention is that it enables the above-described advantages to be obtained without any appreciable increases in weight compared to saddles of a known type Additional features and advantages of the present invention will be more apparent from the detailed description that follows of one embodiment of the invention, illustrated by way of non-restrictive example in the appended figures, in which:

FIG. 1 schematically shows an exploded view of the saddle according to the present invention;

FIG. 2 shows an axonometric view of the saddle according to the present invention;

FIG. 3 shows a view from above of the saddle of FIG. 2;

FIGS. 4 and 5 show detailed views of two inserts of the saddle according to the present invention;

FIG. 6 shows an enlarged view of some inserts of the saddle according to the present invention.

Figure 1:
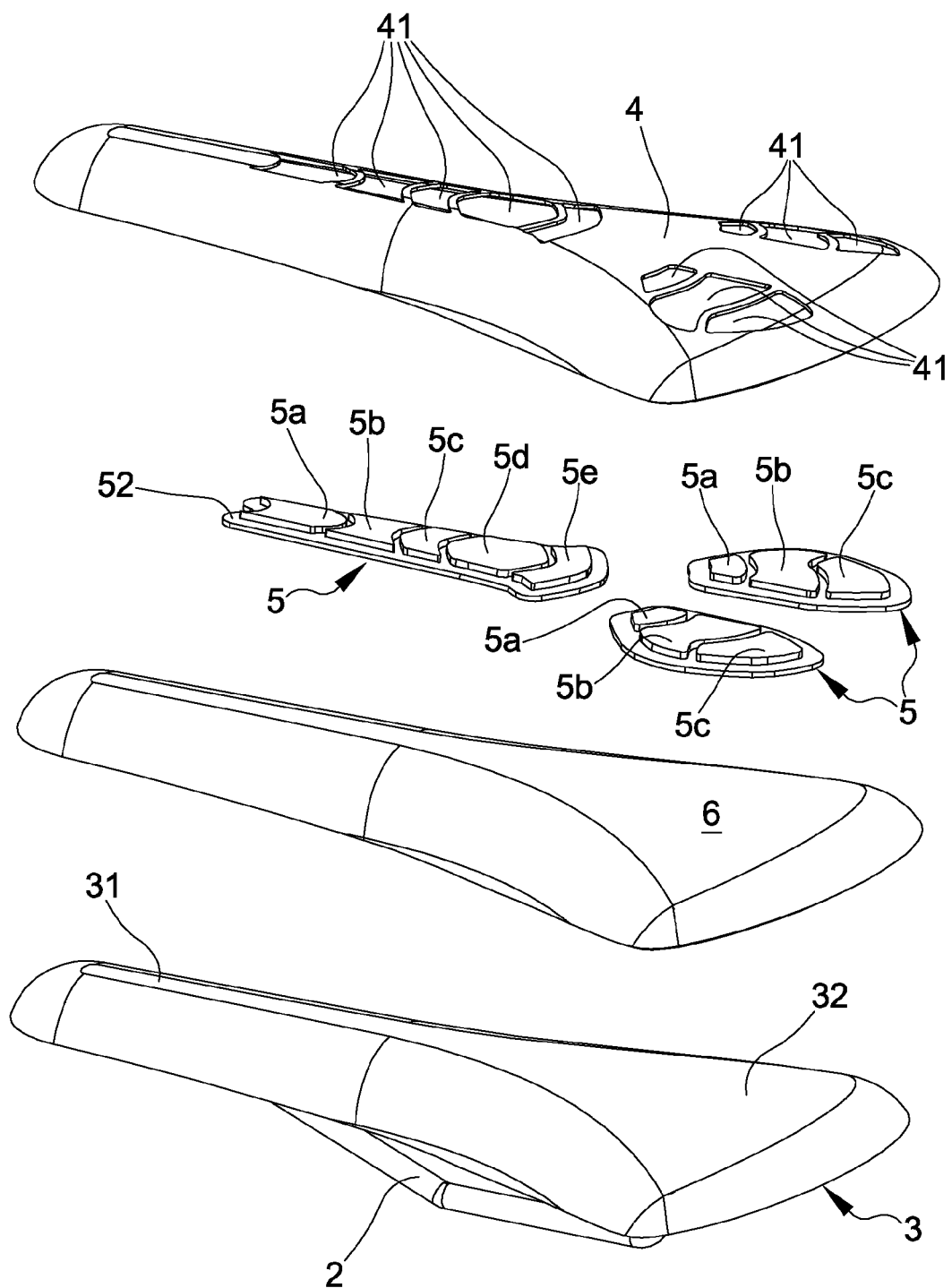

The bicycle saddle according to the present invention comprises a supporting frame (2), set up for connecting the saddle to a seat post. Being a component that is well known to the person skilled in the art, the supporting frame (2) has been only schematically represented.

A resting base (3) is connected to the supporting frame (2). The resting base is substantially intended for transmitting the weight of the cyclist to the supporting frame (2). The conformation of the resting base (3) defines the overall shape of the saddle, as well as position and breadth of the areas of contact between the cyclist and saddle. The resting base (3) is provided with a front portion (31) and a rear portion (32). The front portion (31) is positioned in contact with the perineal area, whereas the rear portion (32) is positioned in contact with the ischial tuberosities.

The saddle further comprises a cover (4), which covers the resting base (3) and is intended for defining the surface of contact with the cyclist. Preferably, but not necessarily, the saddle likewise comprises a padding layer (6) placed above the resting base (3) in order to increase the cyclist's comfort. The padding layer is thus interposed between the resting base (3) and the cover (4).

At least one insert (5), having a high coefficient of friction, is interposed between the resting base (3), or the padding layer (6) if present, and the cover (4). The insert (5) protrudes at least partially from the cover (4) through an opening (41) made on the cover (4). The insert (5) extends in a substantially uniform manner over a relatively broad surface, forming a cushion. The insert (5) is made of material with a high coefficient of friction in order to limit the sliding of the athlete on the saddle, and properties of high elasticity so as to broaden the distribution of pressure on the resting areas of the athlete and enable a dampening of shocks and vibrations.

Preferably, the insert (5) is applied below the cover (4). This means that the cover (4) and insert (5) together form a single body. This makes the manufacture of the saddle considerably easier, since the cover (4) plus associated insert (5) can be substantially managed like a common cover (4), i.e. it can be associated with the resting base (3) using processes broadly applied in the art. Moreover, applying the insert (5) below the cover (4) makes it possible to obtain a very stable, long-lasting coupling between the two parts. Whereas in the presently available saddles any anti-sliding inserts are applied on the outside of the cover (4), for example by welding or gluing, and can thus come detached after a relatively prolonged use, in the saddle according to the present invention the area in which the insert (5) and cover (4) are joined together remains below the cover (4) itself. In particular, the insert (5) can be welded or glued to the bottom of the cover (4). Alternatively, the insert (5) can be sewn to the cover (4), where it is desired to obtain a finish of particular aesthetic refinement.

From a constructive viewpoint, the insert (5) is shaped in the desired manner and is surrounded by an edge portion (52). The edge portion (52) is intended for being associated with the cover (4) around the opening (41) from which the insert (5) is designed to protrude. Between the edge portion (52) and the cover (4) a layer of glue can be interposed, or else they can be welded. Alternatively, the edge portion (52) can be fixed to the cover (4) by sewing.

In a first embodiment of the saddle, the insert (5) is placed in a forward position, in the front portion (31) of the resting base (3). In this position, the insert (5) favours the stability of the athlete in a forward position on the saddle, in which the athlete is capable of delivering greater power.

FIGS. 1, 2 and 3 show a first version of the front insert (5). The insert is divided into a plurality of sectors (5a-5e) aligned along the longitudinal axis (Y) and interspersed by transverse zones that follow the contour of the sectors (5a, 5e) and in which a coupling with the cover (4) is provided. This serves to further increase the firmness of the coupling between the insert (5) and the cover (4). The various sectors (5a-5e) can have different features. Some sectors can have greater anti-sliding properties, whereas other sectors can be configured to enable a better distribution of pressure. The number and shape of the sectors (5a-5e) can vary according to the effect it is desired to obtain.

The front insert (5), moreover, has a conformation that extends prevalently along a longitudinal axis (Y) of the saddle. Preferably, the insert (5) widens backwards towards the rear portion (32). This contributes to extend the area of contact between the insert (5) and the athlete also to a more lateral zone of the front portion, further favouring the stability of the athlete. In particular, the insert (5) of FIGS. 1,2 and 3 has two protruding side portions (53) located in a rear zone of the insert (5) itself. These protruding side portions (53) produce a considerable improvement in the stability of the athlete relative to the front portion (31) of the saddle.

FIG. 4 shows a second version of the insert (5) for the front portion (31). It is divided into a plurality of sectors (5a-5e) aligned along the longitudinal axis (Y) and interspersed by transverse zones, in which a coupling with the cover (4) is provided. The transverse zones follow the contour of the sectors (5a-5e). This enables the firmness of the coupling between the insert (5) and cover (4) to be further increased. The various sectors (5a-5e) can also have different features. Some sectors can have greater anti-sliding properties, whereas other sectors can be configured to enable a better distribution of pressure. In this case as well, the number and shape of the sectors (5a-5e) can vary according to the effect it is desired to obtain. Advantageously, a front sector (5') and a rear sector (5") provided with a rounded end portion can be located at the end of the series of sectors (5a-5e), in order to increase the area in contact with the athlete.

In this second embodiment as well, the insert (5) for the front portion (31) has a conformation that extends prevalently along a longitudinal axis (Y) of the saddle. Preferably, the insert (5) widens backwards towards the rear portion (32). This contributes to extending the area of contact between the insert (5) and the athlete also to a more lateral zone of the front portion, further favouring the stability of the athlete.

In a second embodiment of the saddle, two inserts (5) are arranged in the rear side zones of the resting base (3), i.e. in the zones intended for coming into contact with the ischial tuberosities of the athlete. The two inserts (5) arranged in this position favour greater stability of the athlete in a more rearward position on the saddle, to be preferred in the event of prolonged exertion, during which a more comfortable position on the saddle is advantageous.

The inserts (5) for the rear portion (32) of the saddle are also preferably divided into a plurality of sectors (5a-5c). In this case as well, each sector can be structured to produce different effects. A front sector (5a) can be provided with protruding elements of elongated shape, oriented on planes parallel to the longitudinal axis (Y) in order to limit sliding in a transverse direction. An intermediate sector (5b) and a rear sector (5c) can be provided with cylindrical protruding elements in a more internal zone and elongated, slightly curved protruding elements in a more external zone. The former have a uniform anti-sliding effect in a direction parallel and transverse to the longitudinal axis (Y), the latter have a prevalent anti-sliding effect in a direction parallel to the longitudinal axis (Y).

In the second embodiment of the saddle, an insert (5) can also be placed in the front portion (31) of the resting base (3). With the addition of the insert in the front portion (31), the athlete can choose a more forward or more rearward position on the saddle, benefiting in any case from great stability in the chosen position.

Preferably, the insert (5) is provided with a plurality of protruding elements (51) with a cylindrical or prismatic shape and a constant or variable cross section. The protruding elements (51) are separated from each other by spaces which enable an effective dispersal of heat and humidity.

The conformation of the protruding elements (51) offers important advantages. Firstly, they considerably increase the coefficient of friction of the insert (5). Moreover, the protruding conformation and spaces separating the protruding elements (51) serve to dampen and distribute pressure peaks in a highly effective manner. A further advantage is given by the fact that the continuous muscle contractions produce a deformation of the protruding elements, which in return provide a micro-massage that contributes significantly to reducing stress and the hardening of the muscle fibres. The spaces separating the protruding elements (51) favour the evacuation of heat and humidity, thereby increasing comfort.

The invention claimed is:

1. A bicycle saddle, comprising: a supporting frame (2), set up for connecting the saddle to a seat post; a resting base (3), connected to the supporting frame (2) and effective for transmitting the weight of a cyclist to the supporting frame (2), the resting base (3) having a front portion (31) and a rear portion (32); a cover (4), that covers the resting base (3) and is effective for defining a contact surface with the cyclist; characterised in that the saddle comprises a shock-absorbing anti-sliding insert (5), that protrudes at least partially from the cover (4) through an opening (41) made in the cover (4), the insert (5) having a first portion extending beneath the cover (4), the insert (5) having a plurality of protruding elements (51) extending at least partially from the cover (4) through the opening (41), wherein the insert (5) is a front insert (5), arranged at the front portion (31) of the resting base (3), and wherein the front insert (5) is divided into a plurality of sectors aligned along a longitudinal axis (Y) of the saddle and interspersed by transverse zones, that follow the contour of the sectors, the transverse zones being located beneath respective portions of the cover (4).

2. The saddle according to claim 1, wherein the first portion comprises an edge portion (52) which extends beneath the cover (4).

3. The saddle according to claim 2, wherein said edge portion (52) of the insert (5) is welded, glued or sown to the cover (4).

4. The saddle according to claim 1, wherein the front insert (5) has a conformation that extends prevalently along a longitudinal axis (Y) of the saddle and widens backwards towards the rear portion (32).

5. The saddle according to claim 4, wherein the front insert (5) has two protruding side portions (53) located in a rear zone of the insert (5).

6. The saddle according to claim 4, wherein the protruding elements (51) have a constant or variable cross section.

7. The saddle according to claim 1, comprising two rear inserts (5) arranged at side zones of the rear portion (32) of the resting base (3).

8. The saddle according to claim 7, wherein said rear inserts (5) are divided into a plurality of sectors which are separated by portions of the insert (5) which are located beneath respective portions of the cover (4).

9. The saddle according to claim 7, wherein a first rear insert (5) has a front section (5a) which has protruding elements oriented on planes parallel to a longitudinal axis (Y) of the saddle in order to limit sliding of the cyclist in a transverse direction.

10. The saddle according to claim 7, wherein a first rear insert (5) has an intermediate sector (5b) provided with cylindrical protruding elements in a first zone and elongated, slightly curved protruding elements in a second zone, the first zone being located between the second zone and a longitudinal axis (Y) of the saddle.

11. The saddle according to claim 7, wherein a first rear insert (5) has a rear section (5c) provided with cylindrical protruding elements in a first zone and elongated, slightly curved protruding elements in a second zone, the second zone being located between the first zone and a rear edge of the saddle.

12. The saddle according to claim 1, wherein the protruding elements (51) have a cylindrical or prismatic conformation.

13. A method for making a bicycle saddle, comprising the following steps:
 setting up a supporting frame (2);
 setting up a resting base (3);
 setting up a cover (4) and making at least one opening (41) on the cover (4);
 setting up a shock-absorbing anti-sliding insert (5);
 associating the insert (5) with the cover (4) in such a manner that the insert (5) protrudes from the opening (41);
 associating the cover (4) and the insert (5) associated therewith with the resting base (3), with the insert (5) facing outwards; thereafter proceeding to produce a bicycle saddle according to claim 1.

14. The method according to claim 13, wherein the step of setting up an insert (5) makes an edge portion (52) that surrounds the insert (5) and the step of associating the insert (5) with the cover (4) associates the edge portion (52) with the cover (4).

15. The saddle according to claim 1, wherein the insert (5) is divided into a plurality of sectors which are separated by portions of the insert (5) which are located beneath respective portions of the cover (4), each of the sectors having a plurality of protruding elements (51) protruding at least partially from the cover (4) through openings (41) in the cover (4).

16. The saddle according to claim 1, further comprising two rear inserts (5) arranged at side zones of the rear portion (32) of the resting base (3).

* * * * *